United States Patent
Chowdhury et al.

(10) Patent No.: US 11,481,404 B2
(45) Date of Patent: Oct. 25, 2022

(54) AUTOMATED EVALUATION OF INFORMATION RETRIEVAL

(71) Applicant: International Business Machines Corporation, Armonk, NY (US)

(72) Inventors: Md Faisal Mahbub Chowdhury, Woodside, NY (US); Yu Deng, Yorktown Heights, NY (US); Alfio Massimiliano Gliozzo, Brooklyn, NY (US); Ruchi Mahindru, Elmsford, NY (US); Nandana Mihindukulasooriya, Cambridge, MA (US); Nicolas Rodolfo Fauceglia, Brooklyn, NY (US); Gaetano Rossiello, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 17/022,204

(22) Filed: Sep. 16, 2020

(65) Prior Publication Data
US 2022/0083559 A1    Mar. 17, 2022

(51) Int. Cl.
*G06F 16/2457* (2019.01)
*G06F 16/242* (2019.01)

(52) U.S. Cl.
CPC ...... *G06F 16/24578* (2019.01); *G06F 16/243* (2019.01)

(58) Field of Classification Search
CPC ... G06N 20/00; G06F 16/248; G06F 16/2457; G06F 16/24578; G06F 16/243
See application file for complete search history.

(56) References Cited

U.S. PATENT DOCUMENTS

2011/0252013 A1* 10/2011 Lempel ............... G06F 16/9535 703/2
2014/0310288 A1* 10/2014 Jockisch ........... G06F 16/24578 707/748

FOREIGN PATENT DOCUMENTS

KR        19990047854 A      7/1999

OTHER PUBLICATIONS

Zhang et al., "Information Retrieval Evaluation as Search Simulation: A General Forma Framework for IR Evaluation," ICTIR'17, Oct. 2017, ACM, 2017, Paper Session 6: Interactive and Session Search, 8 pages.

(Continued)

*Primary Examiner* — Hau H Hoang
(74) *Attorney, Agent, or Firm* — Timothy J. Singleton

(57) ABSTRACT

A method, system, and computer program product for automated evaluation of information retrieval systems are provided. The method accesses a natural language query from a set of natural language queries. The natural language query is associated with a query difficulty level. The method generates one or more natural language responses to the natural language natural language query. Each natural language response is associated with at least one facet of the plurality of facets. The method generates a set of feedback cues. A set of search results for the natural language query are returned. The set of search results include a highest ranked natural language response of the one or more natural language responses. The method generates an evaluation result for the HCIR system for the query difficulty level based on the one or more natural language responses, the set of search results, and the set of feedback cues.

20 Claims, 6 Drawing Sheets

(56) References Cited

OTHER PUBLICATIONS

Hu et al., "Interactive Topic Modeling," Machine Learning 95.3 (2014), DOI 10.1007/s10994-013-5413-0, 47 pages.

"Human-computer information retrieval", From Wikipedia, the free encyclopedia, printed May 21, 2020, 4 pages. https://en.wikipedia.org/wiki/Human%E2%80%93computer_information_retrieval.

"HCIR Challenge", HCIR, 2011, printed May 21, 2020, 4 pages. https://sites.google.com/site/hcirworkshop/hcir-2011/challenge.

Johnson, "Evaluating personalised information retrieval: a perception of trust", WEPIR 2019, 2nd Annual Workshop, Mar. 14, 2019, 3 pages. http://www.ir.disco.unimib.it/wepir2019/files/2019/03/Johnson.pdf.

Aliannejadi et al., "Asking Clarifying Questions in Open-Domain Information-Seeking Conversations", SIGIR '19, Jul. 21-25, 2019, Paris, France, © 2019 Association for Computing Machinery, 10 pages. http://maroo.cs.umass.edu/pub/web/getpdf.php?id=1339.

Koren et al., "Personalized Interactive Faceted Search", WWW 2008, Apr. 21-25, 2008, Beijing, China, 9 pages. https://www.ssrc.ucsc.edu/Papers/koren-www08.pdf.

Petzka et al., "Benchmarking Faceted Browsing Capabilities of Triplestores", Semantics2017, Sep. 11-14, 2017, Amsterdam, Netherlands, 8 pages. http://jens-lehmann.org/files/2017/semantics_faceted_browsing.pdf.

Niu et al., "Understanding Faceted Search from Data Science and Human Factor Perspectives", ACM Transactions on Information Systems, vol. 37, No. 2, Article 14. Publication date: Jan. 2019, 27 pages. https://dl.acm.org/doi/10.1145/3284101.

Mell et al., "The NIST Definition of Cloud Computing", Recommendations of the National Institute of Standards and Technology, Special Publication 800-145, Sep. 2011, 7 pages.

\* cited by examiner

AUTOMATED EVALUATION OF INFORMATION RETRIEVAL

BACKGROUND

Databases and data resources use information retrieval systems to surface information being sought by users. Human-computer information retrieval (HCIR) includes systems and techniques for information retrieval that involves humans in a search process. HCIR combines fields of human-computer interaction (HCI) and information retrieval (IR). HCIR systems often take into account a human context of search functionality for databases and data resources. HCIR systems may employ multi-step search processes to provide opportunities for human feedback.

SUMMARY

According to an embodiment described herein, a computer-implemented method for automated evaluation of information retrieval systems is provided. The method accesses a natural language query from a set of natural language queries. The natural language query is associated with a query difficulty level. One or more natural language responses to the natural language query are generated by a human-computer information retrieval (HCIR) system. Each natural language response is associated with at least one facet of a plurality of facets. A set of feedback cues are generated based at least in part on the natural language query. The method returns a set of search results for the natural language query. The search results include a highest ranked natural language response of the one or more natural language responses. An evaluation result is generated for the HCIR system for the query difficulty level. The HCIR is associated with the set of natural language queries, the plurality of facets, and the natural language responses. The evaluation result is generated based on the natural language query, the query difficulty level, the plurality of facets, and the one or more natural language responses.

According to an embodiment described herein, a system for automated evaluation of information retrieval systems is provided. The system includes one or more processors and a computer-readable storage medium, coupled to the one or more processors, storing program instructions that, when executed by the one or more processors, cause the one or more processors to perform operations. The operations access a natural language query from a set of natural language queries. The natural language query is associated with a query difficulty level. One or more natural language responses to the natural language query are generated by a human-computer information retrieval (HCIR) system. Each natural language response is associated with at least one facet of a plurality of facets. A set of feedback cues are generated based at least in part on the natural language query. The operations return a set of search results for the natural language query. The search results include a highest ranked natural language response of the one or more natural language responses. An evaluation result is generated for the HCIR system for the query difficulty level. The HCIR is associated with the set of natural language queries, the plurality of facets, and the natural language responses. The evaluation result is generated based on the natural language query, the query difficulty level, the plurality of facets, and the one or more natural language responses.

According to an embodiment described herein, a computer program product for automated evaluation of information retrieval systems is provided. The computer program product includes a computer-readable storage medium having program instructions embodied therewith, the program instructions being executable by one or more processors to cause the one or more processors to access a natural language query from a set of natural language queries. The natural language query is associated with a query difficulty level. One or more natural language responses to the natural language query are generated by a human-computer information retrieval (HCIR) system. Each natural language response is associated with at least one facet of a plurality of facets. A set of feedback cues are generated based at least in part on the natural language query. The computer program product returns a set of search results for the natural language query. The set of search results include a highest ranked natural language response of the one or more natural language responses. An evaluation result is generated for the HCIR system for the query difficulty level. The HCIR is associated with the set of natural language queries, the plurality of facets, and the natural language responses. The evaluation result is generated based on the natural language query, the query difficulty level, the plurality of facets, and the one or more natural language responses.

DETAILED DESCRIPTION

Figure 1:
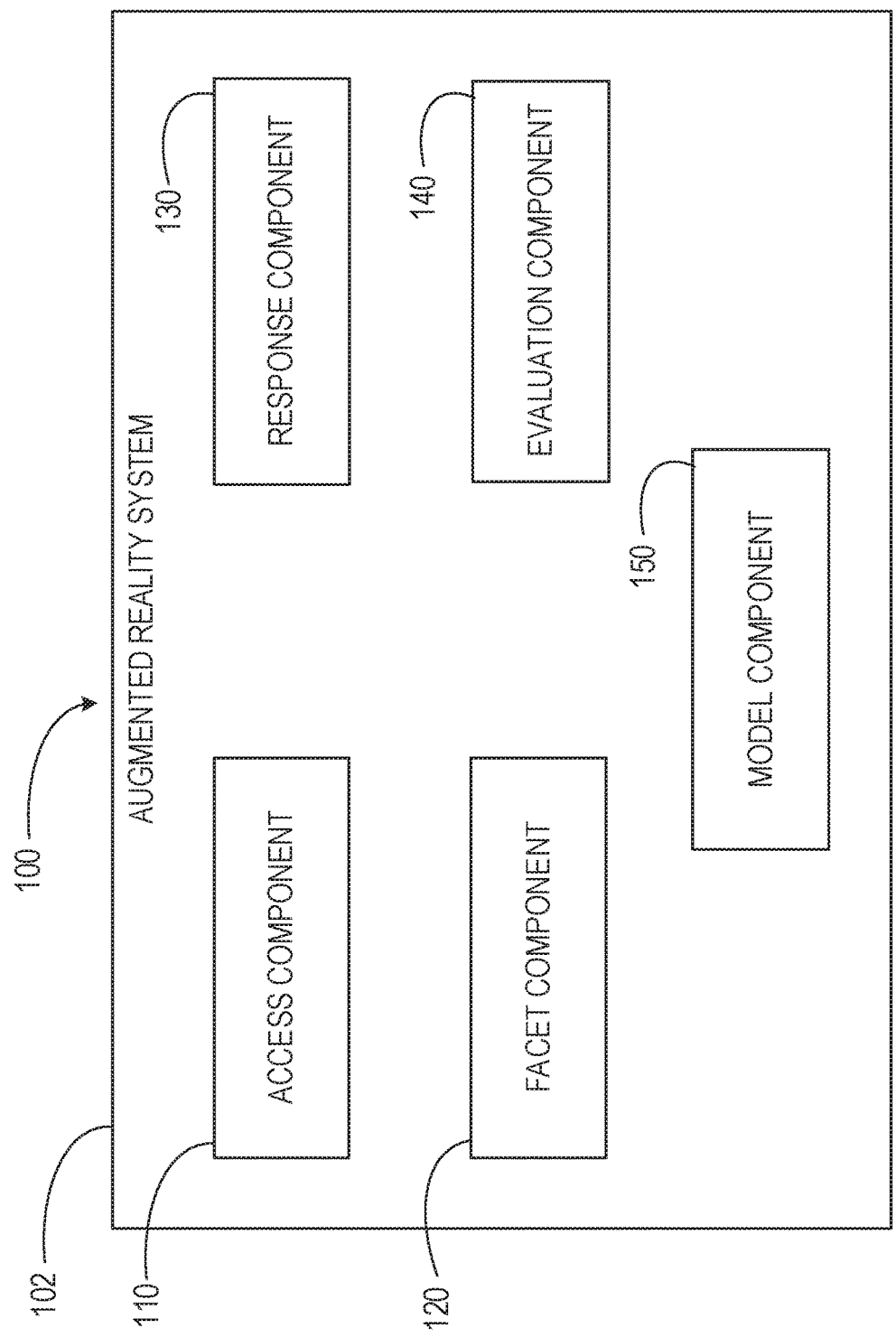
FIG. 1 depicts a block diagram of a computing environment for implementing concepts and computer-based methods, according to at least one embodiment.

The present disclosure relates generally to methods for human-computer information retrieval (HCIR) systems. More particularly, but not exclusively, embodiments of the present disclosure relate to a computer-implemented method for automatically evaluating information retrieval systems, including HCIR systems. The present disclosure relates further to a related system for HCIR system evaluation interfaces and a computer program product for operating such an evaluation system.

HCIR systems may employ varied search functionality or techniques. Some HCIR systems use faceted search, tag clouds, automatic query reformulation, relevance feedback, combinations thereof, and other suitable search or query formulation techniques. HCIR systems often prioritize precision in information retrieval. Prioritizing precision may result in a greater fraction of retrieved documents to be relevant to the search. Such prioritization may result in sacrificing recall, resulting in fewer documents being retrieved relative to a search and available documents which may be relevant to a given search. Prioritization of precision over recall may cause HCIR systems to falter where exploration, elaboration, or iterative refinement of queries is incorporated as part of the HCIR system's search functionality or a user engages with an HCIR system with iterative or subsequent related queries.

When evaluating HCIR systems, existing approaches often rely exclusively on real-time or near real-time involvement of human evaluators. Human evaluation of HCIR systems, whether in real-time or near real-time, causes delays on HCIR systems and may result in decreased efficiency and performance of such systems. Further, human evaluation of HCIR systems is not deterministic and often provides input or recommendations, which only provide a marginal correction or effect, if at all, to an HCIR system.

Embodiments of the present disclosure enable an automated evaluation of HCIR systems and techniques or functionality related thereto. Some embodiments of the present disclosure provide an automated evaluation of search techniques, such as faceted search. Embodiments of the present disclosure enable a deterministic evaluation of HCIR systems and techniques. Such embodiments may enable the systems or computer-implemented methods of the present disclosure to provide data-driven evaluations of HCIR systems to improve the accuracy and validity of results and corrections. HCIR systems using aspects of the present disclosure may generate responses to natural language queries to enable a user to interact with the HCIR system to provide additional clarity for provided natural language queries. Embodiments of the present disclosure enable HCIR systems to generate feedback cues in combination with generated responses to enable better search results and user experience with search functionality. Although discussed with respect to faceted search and use of facets, embodiments of the present disclosure enable generation of feedback cues relating to query expansion, query substitution, document chronology, and other suitable feedback options to improve or iteratively develop queries.

Embodiments of the present disclosure may exploit forum and other repository data to aid in deterministic evaluation results. Some embodiments of the present disclosure simulate user behaviors to aid in the automated evaluation of HCIR systems. In some instances, the present disclosure enables mimicry of human domain experts and selection of a best response for a given natural language query. These embodiments improve search results among additional responses presented by HCIR systems. Embodiments of the present disclosure generate holistic evaluation results. Holistic evaluation results may define an effectiveness of a given technique or functionality of an HCIR system. Holistic evaluation results may define the effectiveness of given techniques or functionality based on a relative difficulty of user queries.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an evaluation system 102. The evaluation system 102 may comprise an access component 110, a response component 120, a feedback component 130, an evaluation component 140, and a model component 150. The access component 110 accesses natural language queries from sets of natural language queries and may select or generate specified natural language queries from one or more of the sets of natural language queries. The response component 120 generates natural language responses to the natural language query. The feedback component 130 generates a set of feedback cues which may include facets from an accessed, selected or generated natural language query. The evaluation component 140 generates evaluation results for an HCIR system under evaluation relative to one or more of the natural language query, the generated response, and a query difficulty level of the natural language query. The model component 150 generates answer models for use in evaluating HCIR systems. Although described with distinct components, it should be understood that, in at least some embodiments, components may be combined or divided, and/or additional components may be added without departing from the scope of the present disclosure.

Figure 2:
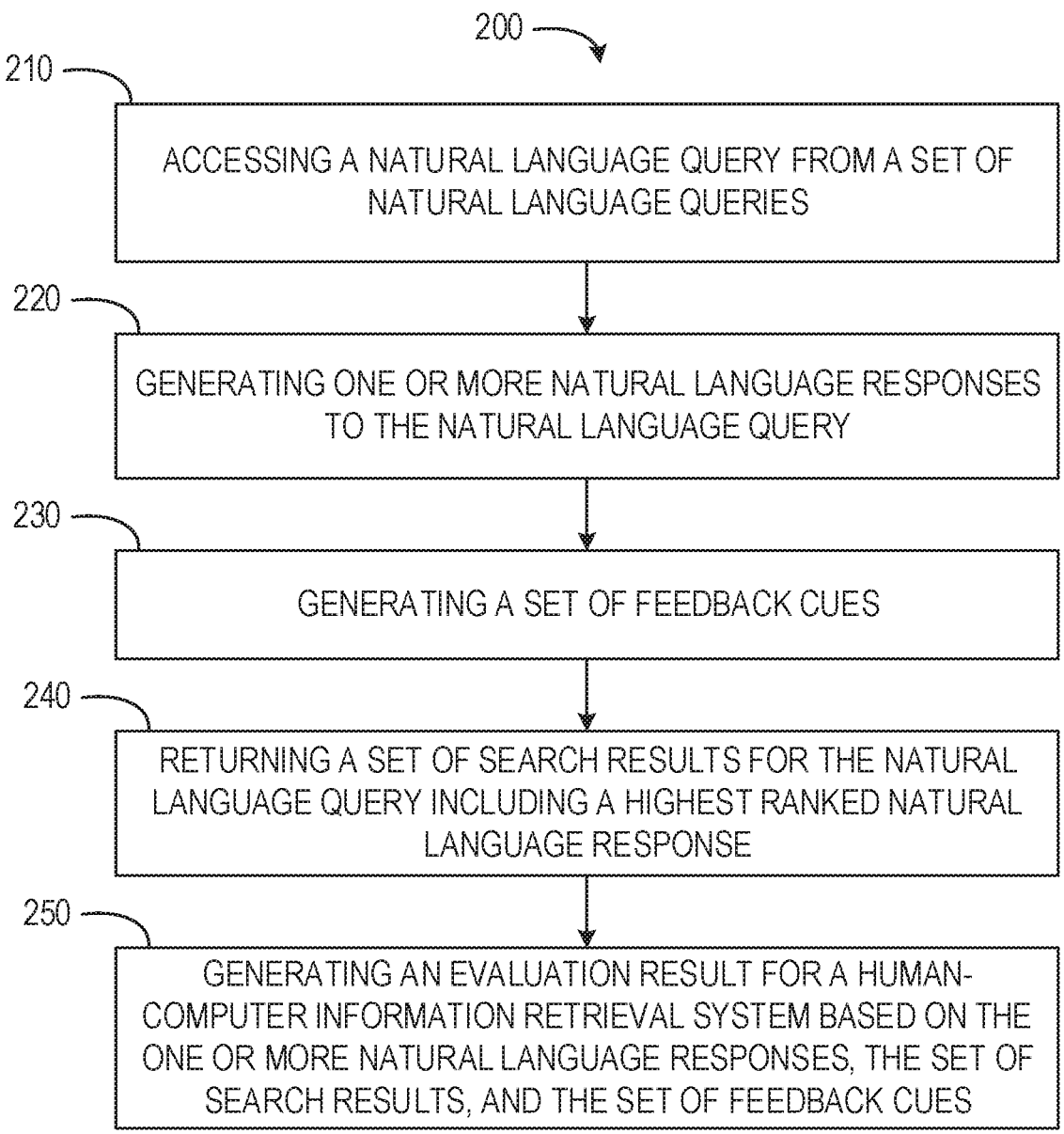
FIG. 2 depicts a flow diagram of a computer-implemented method for automated evaluation of information retrieval systems, according to at least one embodiment.

Referring now to FIG. 2, a flow diagram of a computer-implemented method 200 is shown. The computer-implemented method 200 is a method for automated evaluation of information retrieval systems. In some embodiments, the computer-implemented method 200 may be performed by one or more components of the computing environment 100, as described in more detail below.

At operation 210, the access component 110 accesses a natural language query from a set of natural language queries. In some embodiments, the natural language query is associated with a query difficulty level. The set of natural language queries may be previously generated by natural language queries. In some instances, the natural language query may be generated as a new natural language query. The new natural language query may be generated based on or from the set of natural language queries or generated from a model based on the set of natural language queries. Where the new natural language query is generated based on or from the set of natural language queries, the new natural language query may be a derivation or version of a previously generated natural language query found within the set of natural language queries. Where the new natural language query is generated from a model, the set of natural language queries may be fed into or used to generate a machine learning model of natural language queries to generate a query model. The query model may then be used to generate the new natural language query. In some instances, the query model may be used to generate new natural language queries having selectable levels of difficulty, specificity, or composition. Levels of difficulty may be generated based on a complexity of a natural language query, a complexity of a subject, a word choice or syntax complexity, or any other suitable metric.

The set of natural language queries may include a plurality of user-generated natural language queries in an information repository. In some embodiments, the information repository comprises a forum or knowledge base resource. The user-generated natural language queries may be stored within a data structure or network resource and represent questions that have been asked and answered by a user base of one or more forums or knowledge base resources. In some embodiments, the user-generated natural language queries are associated with query metadata. The query data may include a difficulty rating, a subject tag, one or more keyword tags, an answer tag, a user level, combinations thereof, or any other suitable metadata or information defining aspects of a given natural language query. The difficulty rating may define a difficulty level of a given natural language query. The subject tag may define a subject matter of a given natural language query and a suitable natural language response or answer. Keyword tags may define words included within one or more of a given natural language query and a natural language response answering the natural language query. The answer tag may represent whether a satisfactory answer was provided to a given natural language query in the form of a natural language response. A user-level may represent an experience level of a user associated with one or more of a given natural language query and an associated natural language response. For example, user levels may be divided into expert users, average users, and novice users. In some instances, user levels may be divided based on experience as well as expertise within a specified knowledge field or subject matter.

At operation 220, the response component 120 generates one or more natural language responses to the natural language query. In some embodiments, each natural language response is associated with at least one facet of a plurality of facets. The plurality of facets may be generated to define or express one or more concepts occurring within the natural language query. Facets may include terms, words, sets of words, n-grams, category descriptors, format descriptors, language descriptors, author information, combinations thereof, or any other suitable information elements which may be derived from the text of the natural language query. The plurality of facets may include associated constraints or facet values. Each constraint or facet value may represent a different term or word associated with a given facet, where the facet acts as a category or concept describing or contained within the natural language query.

The response component 120 may generate the one or more natural language responses based on one or more of the natural language query, one or more facets of the natural language query, a difficulty level of the natural language query, queries and responses within a repository, combinations thereof, or any other suitable information. In some embodiments, the response component 120 generates the one or more natural language query using a simulation strategy. Each simulation strategy may be understood as a model for generating a natural language response as an oracle or simulated user. A first oracle associated with a simulation strategy may mimic a user with a vocabulary limited to actual queries and responses within a given repository. A second oracle may mimic a theoretical user having a specified knowledge or experience level. For example, the second oracle may mimic a theoretical user with knowledge enough to always pick a best, most related, or highest confidence facet from the plurality of facets to generate the one or more natural language responses. In instances where the response component 120 generates a plurality of natural language responses, the response component 120 may generate a subset of natural language responses for one or more of the oracles or simulation strategies available to the response component 120.

In some embodiments, the response component 120 generates natural language responses based, at least in part, on previously submitted responses. In such instances, the response component 120 identifies one or more correct responses to a natural language query. In some embodiments, the one or more correct responses are included in a set of responses within an information repository. The one or more correct responses may include a target document resource address. The target document may be a document, resource address, or specified natural language response within the information repository, which was indicated as correctly answering the natural language query within the information repository.

Natural language responses generated based on previously submitted responses, responses within a repository, or simulating a user may use bounded knowledge or bounded knowledge models to generate the natural language response. For example, the bounded knowledge may be limited to a set of responses associated with a natural language query found within a repository. In such instances, bounded knowledge may be in the form of written, logged, or metadata information provided as a priori to an HCIR system along with an original query.

In some embodiments, the response component 120 selects a facet from the plurality of facets generated for the natural language query. The response component 120 may select a facet with a highest confidence score or a highest predicted confidence score. The response component 120 may select a facet that appears within a response post to a similar natural language query found within a repository. The response component 120 may select a facet that provides a best possible rank for the generated natural language response. The response component 120 may then generate the one or more natural language responses based on the selected facet. In instances where the response component 120 generates a plurality of responses, the response component 120 may select one or more facets, generating one or more natural language responses for each selected facet.

At operation 230, the feedback component 130 generates a set of feedback cues. The feedback cues may include query suggestions, query reformulation suggestions, query expansion suggestions, and other suitable modifications to the natural language response. The feedback cues may be generated based on the natural language query. For example, a subset of the feedback cues may include terms or keywords related to terms or concepts within the natural language query. A subset of the feedback cues may include terms or keywords to add or delete from a subsequent natural language query.

In some embodiments, the set of feedback cues include a plurality of facets from the natural language query or a plurality of facets associated with facets contained in the natural language query. The feedback component 130 may select the plurality of facets from the natural language query or a repository of facets. The repository of facets may include facets and interrelations between facets which have previously been included within a natural language query submitted to a repository. In some embodiments, the feedback component 130 generates the plurality of facets from semantic categories, which may have been previously generated.

In some embodiments, the feedback component 130 generates or selects the facets as terms or concepts found within the words contained within the natural language query. In such instances, the feedback component 130 generates or selects the facets in a manner that mimics human vocabulary based on known similar natural language queries or within a natural language query sourced from a knowledge repository. The feedback component 130 may also generate the facets as terms or concepts which are associated with the natural language query. In this way, the feedback component 130 may generate facets that are not be entirely contained within the natural language query. In such instances, the feedback component 130 may generate the facets in a manner mimicking a human with subject matter knowledge suitable to determine the best or most precise facets for concepts within a natural language query.

Each facet of the plurality of facets may be generated with a confidence score. The confidence score may be generated as an indication of relatedness of a given facet to the natural language query. In some instances, confidence scores are generated for facets when one or more of the natural language query and the plurality of facets are generated to mimic a user having a vocabulary limited to actual users who generated a natural language query or a natural language response within a repository.

At operation 240, the response component 130 returns a set of search results for the natural language query. The set of search results may include a highest ranked natural language response. The highest-ranked response may be returned from natural language responses available to the HCIR system, using one or more of the natural language query and the plurality of facets as a query input. In some embodiments, the highest-ranked natural language response is a response associated with a specified document associated with the natural language query. In such embodiments, the natural language query may be selected from a forum or other repository or knowledge base of questions and answers. The natural language query may be a question within the repository or knowledge base, which was originally asked by a user. The highest-ranked natural language response may be a document or response posted as a correct answer to the natural language query within the repository or knowledge base.

At operation 250, the evaluation component 140 generates an evaluation result for the HCIR system for the query difficulty level. The evaluation result may be based on the one or more natural language responses, the set of search results, and the set of feedback cues. The evaluation result may use the highest ranked natural language response as a baseline for evaluating the performance of the HCIR system. In some embodiments, the evaluation result determines a location of natural language responses generated for the natural language query in relation to the baseline and a highest ranked natural language response of the one or more natural language responses generated in operation 230. For example, the evaluation results may identify or focus on queries where the baseline produces or serves as a natural language response with a higher rank than natural language responses generated relative to the natural language query. Such instances may be a short view evaluation. Short view evaluations may be performed for natural language queries associated with a difficulty level below a specified threshold. In some instances, the evaluation result may identify or focus on instances where a baseline produces natural language responses having a lower ranking than natural language responses generated for the natural language query. Such instances may be a long view evaluation. Long view evaluations may be performed for natural language queries associated with a difficulty level above a specified threshold. In some embodiments, the evaluation component 140 may produce an intermediate view evaluation, determining how the HCIR system performs relative to a baseline after increasing a number of oracle interactions.

In some embodiments, the access component 110, the response component 120, the feedback component 130, and the evaluation component 140 cooperate in repeating one or more of the operations 210, 220, 230, and 240. The operations of the method 200 may be repeated until a stop condition occurs. In some embodiments, stop conditions include one or more of an expected natural language response occurring within a top-k results in operation 240, an oracle providing no additional facet or natural language response recommendations, a specified number of iterations has elapsed, a specified number of oracles have been used, combinations thereof, or any other suitable stop conditions. In some embodiments, operations of the method 300 may repeat until a specified stop condition occurs. The specified stop condition may be associated with an evaluation parameter specified by the evaluation component 140 for the evaluation of the HCIR system. The operations of the method 300 may also repeat until a first stop condition is encountered.

Figure 3:
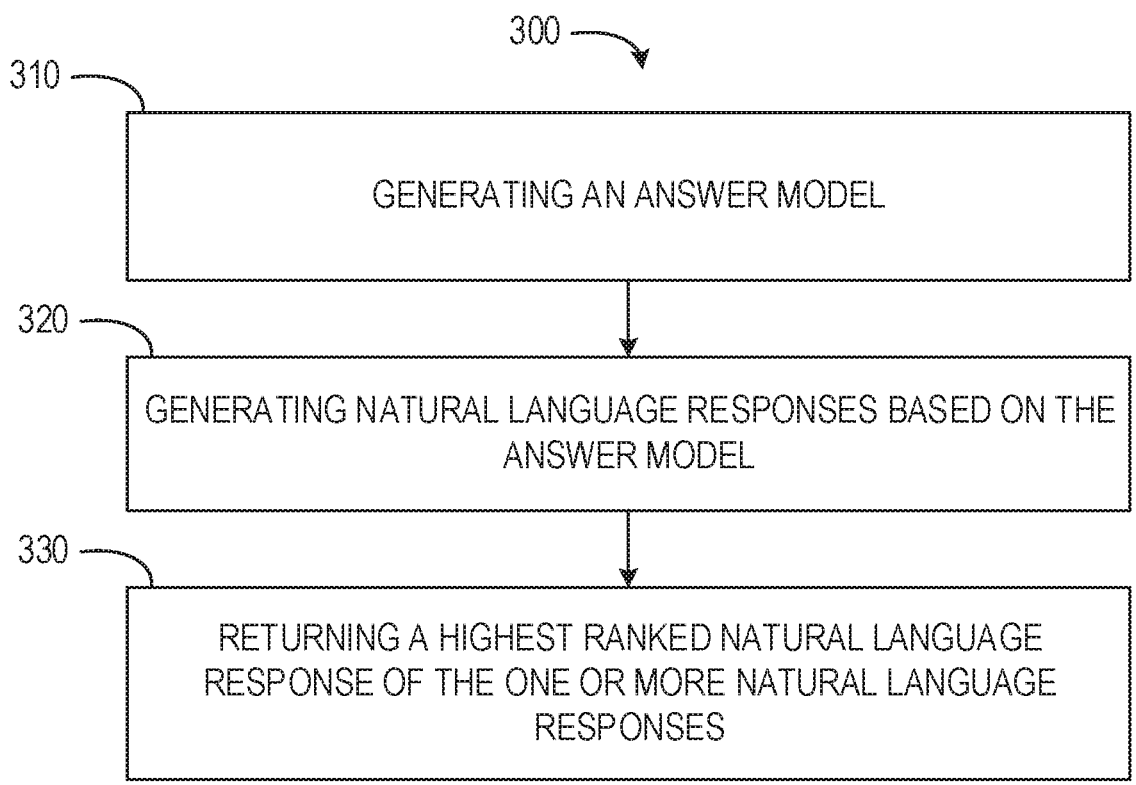
FIG. 3 depicts a flow diagram of a computer-implemented method for automated evaluation of information retrieval systems, according to at least one embodiment.

FIG. 3 shows a flow diagram of an embodiment of a computer-implemented method 300 for automated evaluation of information retrieval systems. The method 300 may be performed by or within the computing environment 100. In some embodiments, the method 300 comprises or incorporates one or more operations of the method 200. In some instances, operations of the method 300 may be incorporated as part of or sub-operations of the method 200, such as operations 210, 220, or 230.

In operation 310, the model component 150 generates an answer model. The model component 150 may generate the answer model based on one or more natural language queries and vocabulary, facets, or scores associated therewith. In some embodiments, the model component 150 generates the answer model from natural language queries and natural language responses contained within an information repository, such as a forum. The model component 150 may generate a plurality of answer models for a given information repository, HCIR system, or evaluation of an HCIR system. In some embodiments, an answer model serves as an oracle, or a portion thereof described above with respect to operation 230.

In some embodiments, the model component 150 generates the answer model as a first answer model. The first answer model is associated with vocabulary contained within a set of responses within an information repository. The set of responses, from which the vocabulary for the first answer model is obtained, may be a set of responses associated with a specified natural language query, such as the natural language query discussed with respect to operation 210. The first answer model may act as a first oracle which selects facets appearing discussion threads or posts retrieved from the information repository. The first oracle associated may mimic a user, in a first simulation strategy, with a vocabulary limited to actual queries and responses within a given repository. The facets which appear only in discussion threads may represent a set of bounded knowledge. The bounded knowledge may include written, logged, and metadata information retrieved from the information repository. The bounded knowledge may be provided as a priori knowledge to the HCIR system along with the natural language query.

In some embodiments, the model component 150 generates the answer model as a second answer model. The second answer model is generated based on a set of confidence scores for a plurality of facets of a natural language query. The second answer model may act as the second oracle, discussed above with respect to operation 230. In some embodiments, the second answer model is configured to select a best, most related, or highest confidence facet from a plurality of facets to generate one or more natural language responses. For each iteration of a faceted search, the second oracle receives generated facets and the natural language query. The second oracle may select one or more best facets which are configured to retrieve a target document at a highest possible rank. In selecting the one or more best facets, the second oracle may select a facet out of a set of generated facets and pass the facet as a filter along with the original natural language query to a search engine, such as a search engine associated with the HCIR system. The second oracle may review a returned set of results to identify whether the selected facet improved a ranking of the target document. If the facet improves the ranking of the target document, the second oracle may select and suggest the facet. Where the facet does not improve the ranking, the second oracle may not recommend the facet and may instead select a different facet and repeat at least a portion of the process.

In some instances, the second answer model generates natural language responses using facets, of the plurality of facets, which have confidence scores above a specified threshold. The facets used for generating natural language responses may also be those having a highest confidence score or a range of confidence scores. In some instances, the second answer model removes facets which are not found within the discussion threads or posts retrieved from the information repository prior to generating natural language responses. The second answer model may remove facets from the plurality of facets which are associated with a confidence score below a specified threshold prior to generating the natural language responses.

In instances where the response component 130 generates a plurality of natural language responses, the response component 130 may generate a subset of natural language responses for one or more of the oracles or simulation strategies available to the response component 130. The response component 130 may generate a plurality of natural language responses using the first answer model or the second answer model. In some embodiments, the response component 130 generates the plurality of natural language responses using both the first answer model and the second answer model. In such instances, the response component 130 generates the plurality of natural language responses to preclude single perspective or single view evaluation of the HCIR system.

In some embodiments, the response component 130 generates the plurality of natural language responses based on the stop condition described above with respect to the method 200. The response component 130 may initially generate natural language responses using the first answer model. Where the initially generated natural language responses fail to encounter or trigger a stop condition, the response component 130 may generate subsequent natural language responses using the second answer model. The response component 130 may generate the plurality of natural language responses for a single generated natural language query.

In operation 320, the response component 130 generates natural language responses based on the answer model generated in operation 310. The response component 130 may generate the natural language responses in a manner similar to or the same as described above with respect to operation 230. The response component 130 may generate the natural language responses based on the first answer model, the second answer model, or a combination thereof. The response component 130 may generate the natural language responses iteratively. In such embodiments, the response component 130 may initially select an answer model, such as the first answer model, to generate natural language responses. The response component 130 may subsequently select a different answer model, such as the second answer model, to generate subsequent natural language responses.

In some embodiments, one or more natural language responses are generated using the first answer model. Each of the one or more natural language responses may include a facet occurring within the vocabulary of the set of responses from which the first answer model is generated. The facet may be associated with a highest confidence score of a plurality of facets included in the set of responses. In some embodiments, the one or more natural language responses are generated using a set of facets. Each facet of the set of facets may be associated with a confidence score. In such embodiments, each natural language response may be associated with a different facet and a different confidence score.

In some embodiments, one or more natural language responses are generated using the second answer model. Each of the one or more natural language responses may include a facet corresponding to a highest rank for the target document. The target document may be a document, resource address, or natural language response indicated as correctly answering the natural language query within the information repository.

In operation 330, the response component 130 returns a highest ranked natural language response of the one or more natural language responses. The highest-ranked natural language response may be selected from natural language responses generated in operation 320. In some embodiments, the highest ranked natural language response may be selected from the natural language responses generated by first answer model or the second answer model.

In some embodiments, the highest ranked natural language response may include a plurality of natural language responses. The plurality of natural language responses may include natural language responses generated by one or more of the first answer model and the second answer model. In some instances, the plurality of natural language responses may include one or more natural language responses selected from the information repository.

Figure 4:
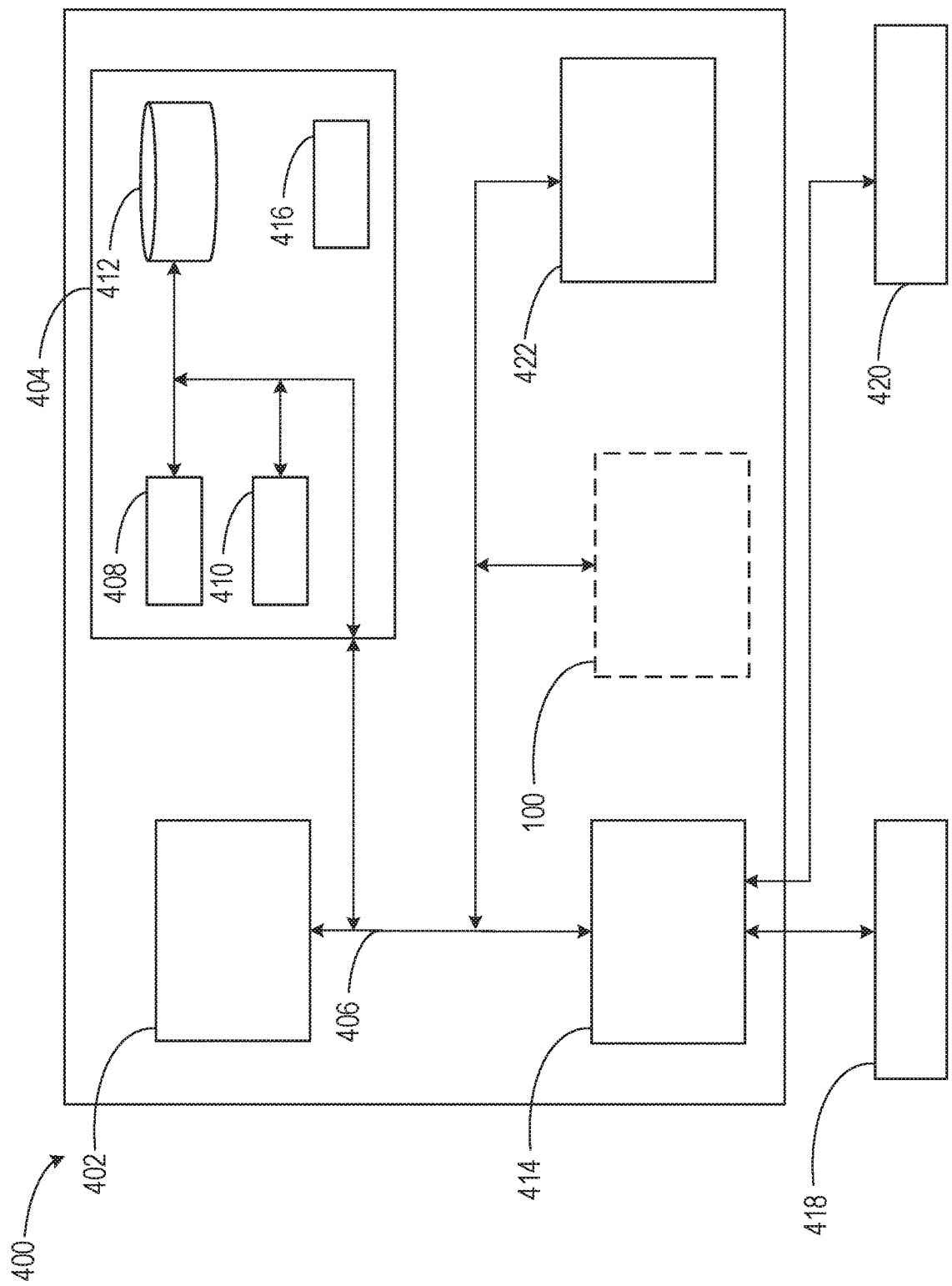
FIG. 4 depicts a block diagram of a computing system for automated evaluation of information retrieval systems, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for automated evaluation of information retrieval systems.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the access component 110, the response component 120, the feedback component 130, the evaluation component 140, and the model component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
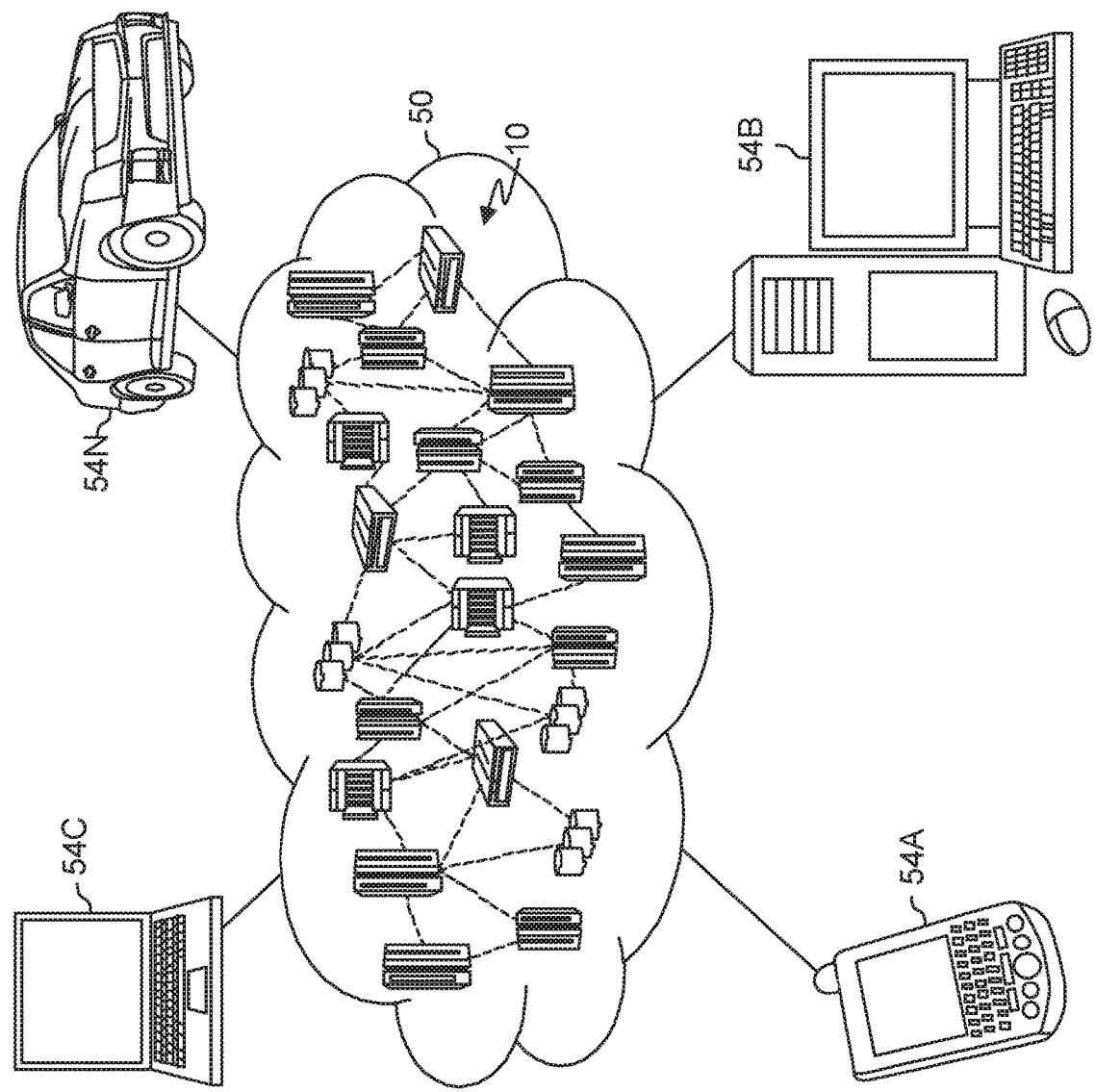
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
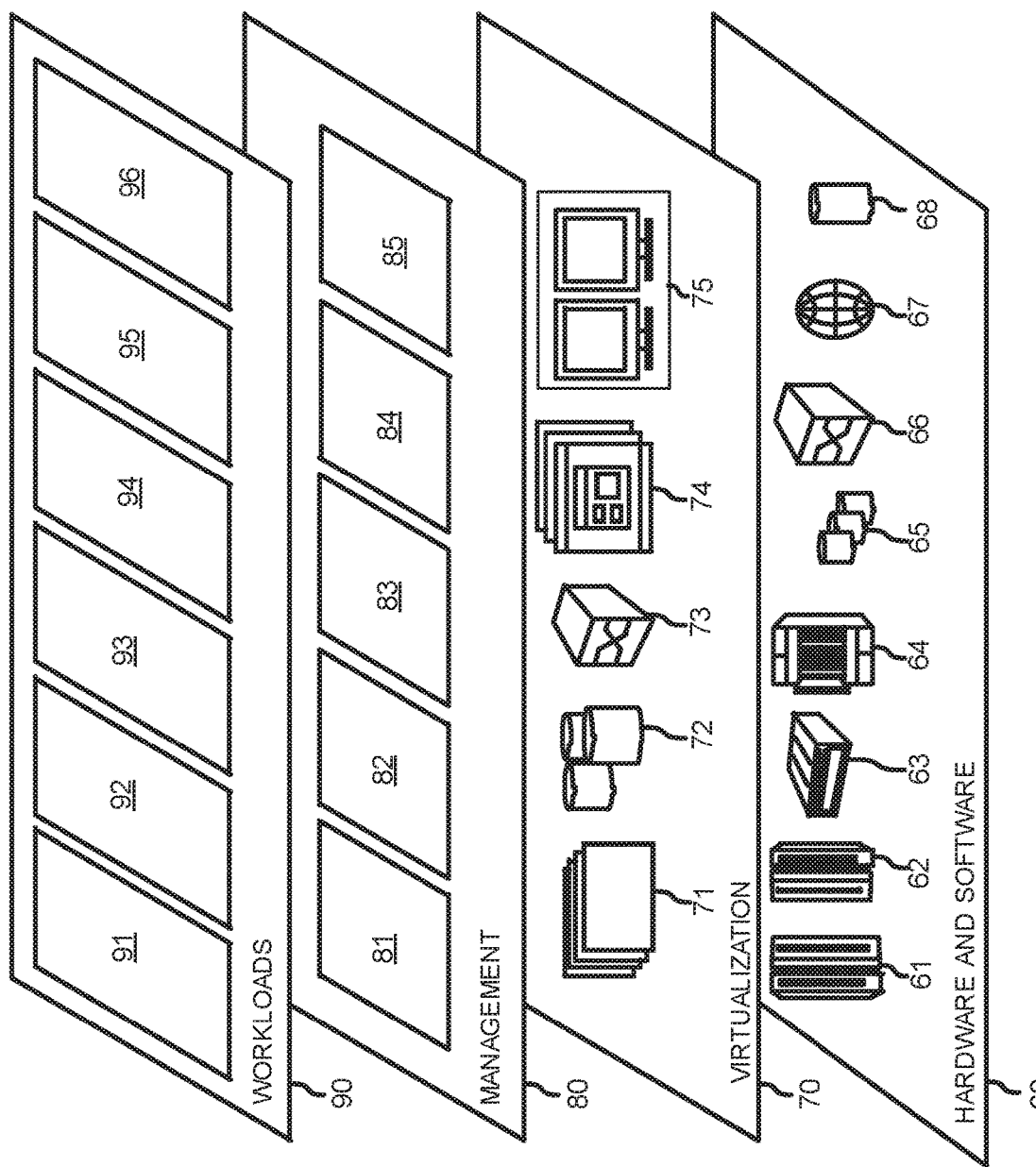
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evaluation processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    accessing a natural language query from a set of natural language queries, the natural language query being associated with a query difficulty level;
    generating one or more natural language responses to the natural language query, each natural language response being associated with at least one facet of a plurality of facets;
    generating a set of feedback cues;
    returning, by an HCIR system, a set of search results for the natural language query, the set of search results including a highest ranked natural language response of the one or more natural language responses; and
    generating an evaluation result for the HCIR system for the query difficulty level based on the one or more natural language responses, the set of search results, and the set of feedback cues.

2. The method of claim 1, wherein the set of natural language queries include a plurality of user generated natural language queries in an information repository.

3. The method of claim 2, further comprising:
    identifying one or more correct responses to the natural language query, the one or more correct responses being included in a set of responses within the information repository and the one or more correct responses including a target document resource address.

4. The method of claim 3, further comprising:
    generating a first answer model associated with vocabulary contained within the set of responses within the information repository.

5. The method of claim 4, wherein the one or more natural language responses are generated using the first answer model, each of the one or more natural language responses including a facet occurring within the vocabulary of the set of responses, the facet being associated with a highest confidence score of the plurality of facets.

6. The method of claim 3, further comprising:
    generating a second answer model based on a set of confidence scores for the plurality of facets.

7. The method of claim 6, wherein the one or more natural language responses are generated using the second answer model, each of the one or more natural language responses including a facet corresponding to a highest rank for the target document.

8. A system, comprising:
    one or more processors; and
    a computer-readable storage medium, coupled to the one or more processors, storing program instructions that, when executed by the one or more processors, cause the one or more processors to perform operations comprising:
        accessing a natural language query from a set of natural language queries, the natural language query being associated with a query difficulty level;
        generating one or more natural language responses to the natural language query, each natural language response being associated with at least one facet of a plurality of facets;
        generating a set of feedback cues;
        returning, by an HCIR system, a set of search results for the natural language query, the set of search results including a highest ranked natural language response of the one or more natural language responses; and
        generating an evaluation result for the HCIR system for the query difficulty level based on the one or more natural language responses, the set of search results, and the set of feedback cues.

9. The system of claim 8, wherein the set of natural language queries include a plurality of user generated natural language queries in an information repository.

10. The system of claim 9, wherein the operations further comprise:
    identifying one or more correct responses to the natural language query, the one or more correct responses being included in a set of responses within the information repository and the one or more correct responses including a target document resource address.

11. The system of claim 10, wherein the operations further comprise:

generating a first answer model associated with vocabulary contained within the set of responses within the information repository.

12. The system of claim 11, wherein the one or more natural language responses are generated using the first answer model, each of the one or more natural language responses including a facet occurring within the vocabulary of the set of responses, the facet being associated with a highest confidence score of the plurality of facets.

13. The system of claim 10, wherein the operations further comprise:
generating a second answer model based on a set of confidence scores for the plurality of facets.

14. The system of claim 13, wherein the one or more natural language responses are generated using the second answer model, each of the one or more natural language responses including a facet corresponding to a highest rank for the target document.

15. A computer program product comprising a computer readable storage medium having program instructions embodied therewith, the program instructions being executable by one or more processors to cause the one or more processors to perform operations comprising:
accessing a natural language query from a set of natural language queries, the natural language query being associated with a query difficulty level;
generating one or more natural language responses to the natural language query, each natural language response being associated with at least one facet of a plurality of facets;
generating a set of feedback cues;
returning, by an HCIR system, a set of search results for the natural language query, the set of search results including a highest ranked natural language response of the one or more natural language responses; and
generating an evaluation result for the HCIR system for the query difficulty level based on the one or more natural language responses, the set of search results, and the set of feedback cues.

16. The computer program product of claim 15, wherein the set of natural language queries include a plurality of user generated natural language queries in an information repository, and wherein the operations further comprise:
identifying one or more correct responses to the natural language query, the one or more correct responses being included in a set of responses within the information repository and the one or more correct responses including a target document resource address.

17. The computer program product of claim 16, wherein the operations further comprise:
generating a first answer model associated with vocabulary contained within the set of responses within the information repository.

18. The computer program product of claim 17, wherein the one or more natural language responses are generated using the first answer model, each of the one or more natural language responses including a facet occurring within the vocabulary of the set of responses, the facet being associated with a highest confidence score of the plurality of facets.

19. The computer program product of claim 16, wherein the operations further comprise:
generating a second answer model based on a set of confidence scores for the plurality of facets.

20. The computer program product of claim 19, wherein the one or more natural language responses are generated using the second answer model, each of the one or more natural language responses including a facet corresponding to a highest rank for the target document.

* * * * *